United States Patent
Hoshino

(10) Patent No.: US 10,655,587 B2
(45) Date of Patent: May 19, 2020

(54) ENGINE STOP/START CONTROL APPARATUS

(71) Applicant: DENSO CORPORATION, Kariya, Aichi-pref. (JP)

(72) Inventor: Shogo Hoshino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/099,875

(22) PCT Filed: Apr. 27, 2017

(86) PCT No.: PCT/JP2017/016761
§ 371 (c)(1),
(2) Date: Nov. 8, 2018

(87) PCT Pub. No.: WO2017/195629
PCT Pub. Date: Nov. 16, 2017

(65) Prior Publication Data
US 2019/0153991 A1 May 23, 2019

(30) Foreign Application Priority Data
May 10, 2016 (JP) ................................. 2016-094757

(51) Int. Cl.
*F02N 11/08* (2006.01)
*F02D 41/04* (2006.01)
(Continued)

(52) U.S. Cl.
CPC .......... *F02N 11/0818* (2013.01); *F02D 29/02* (2013.01); *F02D 41/04* (2013.01);
(Continued)

(58) Field of Classification Search
CPC ........... F02N 11/0818; F02N 2200/022; F02D 43/00; F02D 45/00; F02D 29/02; F02D 41/04
(Continued)

(56) References Cited

U.S. PATENT DOCUMENTS 9,366,217 B2 *   6/2016   Crisp ................. F02M 11/0844
2011/0146609 A1  6/2011   Enoki
2015/0051773 A1  2/2015   Hayashi et al.

FOREIGN PATENT DOCUMENTS

JP    2000-257458 A    9/2000
JP    2007-064032 A    3/2007
(Continued)

OTHER PUBLICATIONS

Jul. 25, 2017 International Search Report issued in International Patent Application No. PCT/JP2017/016761.

*Primary Examiner* — Hai H Huynh
(74) *Attorney, Agent, or Firm* — Oliff PLC

(57) ABSTRACT

An ECU makes an opening degree of a throttle valve larger than an opening degree in an idle rotating state of an engine in a rotation drop period during which engine speed drops to zero after combustion of the engine is stopped. Further, the ECU determines that the engine speed is within a predetermined rotation speed range including at least a resonance range of the engine in the rotation drop period, and, in the case where it is determined that the engine speed is within the predetermined rotation speed range, the ECU performs rotation drop processing of temporarily increasing a drop rate of the engine speed.

8 Claims, 7 Drawing Sheets

(51) Int. Cl.
 *F02D 29/02* (2006.01)
 *F02D 45/00* (2006.01)
 *F02D 43/00* (2006.01)
(52) U.S. Cl.
 CPC ............. *F02D 43/00* (2013.01); *F02D 45/00* (2013.01); *F02N 2200/022* (2013.01)
(58) Field of Classification Search
 USPC ...... 123/179.3, 179.4, 179.18, 399; 701/103, 701/110, 112, 113
 See application file for complete search history.

(56) References Cited

FOREIGN PATENT DOCUMENTS

| | | |
|---|---|---|
| JP | 2010-203331 A | 9/2010 |
| JP | 2012-172566 A | 9/2012 |

\* cited by examiner

ENGINE STOP/START CONTROL APPARATUS

CROSS-REFERENCE TO RELATED APPLICATION

The present application is based on and claims the benefit of priority from earlier Japanese Patent Application No. 2016-094757 filed on May 10, 2016, the description of which is incorporated herein by reference.

TECHNICAL FIELD

The present disclosure relates to an engine stop/start control apparatus.

BACKGROUND ART

Conventionally, a technique of implementing so-called idling stop control of automatically stopping an engine if predetermined automatic stop conditions are fulfilled, and, thereafter, restarting the engine if predetermined restart conditions are fulfilled, is known.

When an engine is automatically stopped, an opening degree of a throttle valve is made smaller than a predetermined opening degree, so that supply of air to a cylinder is restricted. However, in such a case, when the engine restarts, a sufficient amount of air cannot be secured for combustion, which may lead to worse restart.

In the technique disclosed in PTL 1, control is performed so that an opening degree of a throttle valve is made smaller than a predetermined opening degree when an engine is automatically stopped, and, if engine speed becomes equal to or less than a predetermined value, the throttle valve which has been closed is once opened to more than the predetermined opening degree, and then, is closed again. By this means, a minimum required amount of air for restarting the engine is secured, to alleviate delay when the engine restarts.

CITATION LIST

Patent Literature

[PTL 1] JP 2012-172566 A

SUMMARY OF THE INVENTION

However, in PTL 1, when idling stop is implemented, if the throttle valve is opened to introduce air before rotation of an engine output shaft is stopped, there is a concern that compression reactive force within a cylinder increases, which results in increasing vibration. In addition, since there is a time period during which the throttle valve is closed, there is still a risk that the amount of air is insufficient when the engine restarts.

The present disclosure is mainly directed to providing an engine control apparatus which is capable of securing startability when an engine restarts while suppressing occurrence of vibration when the engine is automatically stopped in a vehicle having an idling stop function.

A first disclosure is an engine stop/start control apparatus which is applied to an engine in which a throttle valve is provided to an intake part, and which automatically stops the engine in association with fulfillment of a predetermined automatic stop condition, and, thereafter, restarts the engine in association with fulfillment of a predetermined restart condition, the engine stop/start control apparatus including a throttle control section configured to make an opening degree of the throttle valve larger than an opening degree in an idle rotating state of the engine in a rotation drop period until engine speed drops to zero after combustion of the engine is stopped, a resonance range determining section configured to determine that the engine speed is within a predetermined rotation speed range including at least a resonance range of the engine in the rotation drop period, and a rotation drop control section configured to, in the case where it is determined that the engine speed is within the predetermined rotation speed range, perform rotation drop processing of temporarily increasing a drop rate of the engine speed.

According to the above-described configuration, by making the opening degree of the throttle valve larger after combustion of the engine is stopped, it is possible to secure a sufficient amount of air required when the engine restarts. Further, by increasing the drop rate of the engine speed in the predetermined rotation speed range including the resonance range, it is possible to shorten a time period during which the engine speed passes through the resonance range. In this case, while there is a concern that vibration may increase in the resonance range in a state where the throttle opening degree is large, shortening the time period during which the engine speed passes through the resonance range can suppress increase in vibration. By this means, in a vehicle having an idling stop function, it is possible to secure startability when the engine restarts while suppressing occurrence of vibration when the engine is automatically stopped.

A second disclosure is an engine stop/start control apparatus which is applied to a system including an auxiliary device which is capable of applying counter torque, which is torque on an inverse rotation side, to an engine output shaft, and in which the rotation drop control section applies counter torque to the engine output shaft by the auxiliary device as the rotation drop processing.

With the above-described configuration, by applying counter torque by the auxiliary device, it is possible to use a device which is normally provided to a vehicle in the rotation drop processing. Therefore, it is not necessary to separately provide an additional device, which is economical.

A third disclosure is an engine stop/start control apparatus in which the auxiliary device is a rotating electrical machine which is drive-coupled to the engine output shaft, and which has functions of power generation and power driving.

With the above-described configuration, by using the rotating electrical machine as the auxiliary device, it is possible to apply greater counter torque. By this means, a time period during which the engine speed passes through the resonance range is further shortened, so that an effect of suppressing vibration is improved.

A fourth disclosure is an engine stop/start control apparatus in which the predetermined rotation speed range is determined such that predetermined rotation speed on a higher rotation side of the resonance range is set as an upper limit, and the rotation drop control section starts the rotation drop processing in the case where it is determined by the resonance range determining section that the engine speed is equal to or less than the upper limit.

With the above-described configuration, in the case where it is determined that the engine speed is equal to or less than the predetermined rotation speed on the higher rotation side of the resonance range, the rotation drop processing is started. In such a case, by starting the rotation drop processing before the engine speed reaches the resonance range, it is possible to improve response to the drop rate near a boundary value of the resonance range. As a result, a time period during which the engine speed passes through the resonance range is further shortened, so that an effect of suppressing vibration is improved.

A fifth disclosure is an engine stop/start control apparatus in which self-recovery rotation speed is determined as engine speed at which the engine is able to be autonomously recovered after combustion of the engine is stopped, the predetermined rotation speed range is determined such that self-recovery rotation speed of the engine on a higher rotation side of the resonance range is set as an upper limit, and the rotation drop control section starts the rotation drop processing in a case where it is determined by the resonance range determining section that the engine speed is equal to or less than the upper limit.

With the above-described configuration, in the case where it is determined that the engine speed is equal to or less than the self-recovery rotation speed on the higher rotation side of the resonance range, the rotation drop processing is started. In such a case, it is possible to expect a possibility that the engine is autonomously recovered without the drop rate of the engine speed being increased in an early stage in which the engine speed starts to drop in association with combustion of the engine being stopped. By this means, it is possible to improve response to the drop rate in the resonance range and improve an effect of suppressing vibration while reducing power consumption required for restart.

A sixth disclosure is an engine stop/start control apparatus in which the predetermined rotation speed range is determined such that predetermined rotation speed set in advance on a lower rotation side of the resonance range is set as a lower limit, and the rotation drop control section stops the rotation drop processing in a case where it is determined by the resonance range determining section that the engine speed is less than the lower limit.

With the above-described configuration, in the case where it is determined that the engine speed is less than the predetermined rotation speed set in advance on the lower rotation side of the resonance range, the rotation drop processing is stopped. In such a case, it is possible to expect a possibility that the engine can be restarted by cranking without the drop rate of the engine speed being increased while the engine speed is within a range between the predetermined rotation speed set in advance and zero. As a result, it is possible to secure startability of restart while suppressing vibration in the resonance range.

A seventh disclosure is an engine stop/start control apparatus in which the throttle control section makes the opening degree of the throttle valve larger than the opening degree in the idle rotating state at a time point at which combustion of the engine is stopped in association with fulfillment of the automatic stop condition.

With the above-described configuration, by opening the throttle valve more at a time point at which combustion of the engine is stopped, even in the case where the restart condition is fulfilled immediately after combustion is stopped, it is possible to secure a sufficient amount of air, so that startability when the engine restarts becomes favorable.

BRIEF DESCRIPTION OF DRAWINGS

The above and other objects, features and advantages of the present disclosure will become clearer from the following detailed description with reference to the accompanying drawings, in which.

DESCRIPTION OF EMBODIMENT

An embodiment of the present disclosure will be described below on the basis of the drawings. In the present embodiment, a control system for an engine installed in a vehicle is embodied. In the control system, an operation state, or the like, of an engine is controlled mainly using an electronic control unit (hereinafter, referred to as an ECU). An overall schematic diagram of the present system is illustrated in FIG. 1.

Figure 1:
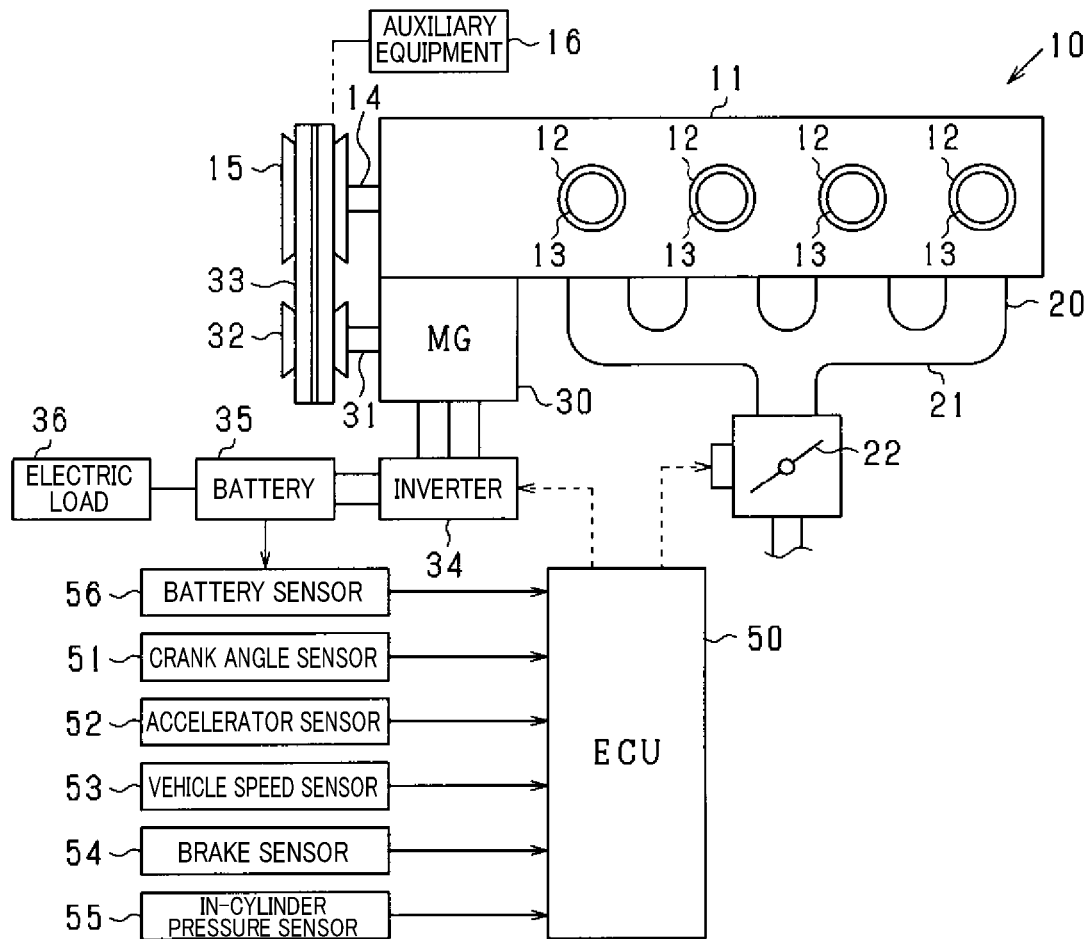
FIG. 1 is a schematic configuration diagram of an engine control system.

In a vehicle 10 illustrated in FIG. 1, an engine 11 is a four-stroke engine which is driven through combustion of fuel such as gasoline, and which repeatedly performs respective strokes of intake, compression, expansion and exhaust. The engine 11 has four cylinders 12, and a piston 13 is disposed in each of the cylinders 12. Further, the engine 11 includes fuel injection valves (not illustrated), ignition devices (not illustrated), or the like, as appropriate. Note that, while, in the present embodiment, an engine with four cylinders is illustrated, the engine may have any number of cylinders. Further, the engine 11 is not limited to a gasoline engine, and may be a diesel engine.

To the cylinder 12, air is supplied from an intake part 20. The intake part 20 includes an intake manifold 21, and a throttle valve 22 which adjusts the amount of air intake is provided upstream of the intake manifold 21.

In the engine 11, an MG (motor generator) 30 is integrally provided. The MG 30 is rotating electrical machine which is driven as an electric motor and a generator. A crank shaft (engine output shaft) 14 of the engine 11 is mechanically connected to a crank pulley 15, and a rotating shaft 31 of the MG 30 is mechanically connected to an MG pulley 32. The crank pulley 15 is drive-coupled to the MG pulley 32 with a belt 33. When the engine starts, initial rotation (cranking rotation) is provided to the engine 11 by rotation of the MG 30. Note that, it is also possible to employ a configuration in which a starter motor is separately provided, and initial rotation is provided to the engine 11 by rotation of the starter motor.

Further, the MG 30 is connected to a battery 35 via an inverter 34 which is a power conversion circuit. In the case where the MG 30 is driven as an electric motor, electric power is supplied to the MG 30 from the battery 35 via the inverter 34 by a command from the ECU 50. As a result, the MG 30 is driven. To the inverter 34, another ECU which controls the power conversion circuit of the inverter 34 in response to a command from the ECU 50 may be provided. Meanwhile, in the case where the MG 30 functions as a generator, after electric power generated at the MG 30 is converted from AC to DC at the inverter 34, the battery 35 is charged with this electric power. Note that electric loads 36 such as lamps and an audio device are connected to the battery 35.

In the vehicle 10, as auxiliary devices which are driven by rotation of the crank shaft 14, in addition to the MG 30, auxiliary equipment 16 such as a water pump, a fuel pump and a compressor of an air conditioner is mounted. Note that the auxiliary devices include a device whose coupled state with the crank shaft 14 is intermitted by a clutch means, in addition to a device such as the auxiliary equipment 16 which is drive-coupled to the engine 11 with a belt or the like.

The ECU 50, which is an electronic control apparatus including a microcomputer, and the like, configured by well-known CPU, ROM, RAM, and the like, performs various kinds of engine control such as opening degree control of the throttle valve 22 and control of fuel injection by the fuel injection valve on the basis of detection results of various kinds of sensors provided in the present system.

For details of sensors, to the ECU 50, a crank angle sensor 51 which detects a rotational position of the crank shaft 14 and engine speed Ne, an accelerator sensor 52 which detects the operation amount of an accelerator (accelerator opening degree), a vehicle speed sensor 53 which detects vehicle speed, a brake sensor 54 which detects the operation amount of a brake pedal, an in-cylinder pressure sensor 55 which detects an in-cylinder pressure within a cylinder, and a battery sensor 56 which detects a battery state of the battery 35 are connected, and signals from these sensors are sequentially input to the ECU 50.

Examples of the crank angle sensor 51 can include an electromagnetic pickup type rotational position detecting means, or the like, which outputs a rectangular detection signal (crank pulse signal) for each predetermined crank angle (for example, with a period of 10° CA). The engine speed Ne is calculated from a time period taken every time the crank shaft 14 rotates by 10° CA. Further, from the detection result of the rotational position, as well as the rotational position of the crank shaft 14 with respect to a predetermined reference position (for example, a compression top dead center) being calculated, a stroke of the engine 11 is determined.

The battery sensor 56 detects a voltage between terminals, a charge/discharge current, or the like, of the battery 35. On the basis of these detection values, the remaining capacity (SOC) of the battery 35 is calculated.

Further, the ECU 50 performs idling stop control of the engine 11. In the idling stop control, generally, combustion of the engine 11 is stopped when predetermined automatic stop conditions are fulfilled, and, thereafter, the engine 11 is restarted when predetermined restart conditions are fulfilled. In this case, the automatic stop conditions include, for example, a condition that vehicle speed of the own vehicle is within an engine automatic stop speed range (for example, vehicle speed ≤10 km/h) and accelerator operation is cancelled or brake operation is performed. Further, the restart conditions include, for example, a condition that accelerator operation is started, and a condition that brake operation is cancelled. Note that it is also possible to employ a configuration in which an engine control function and an idling stop function are implemented by different ECUs 50.

Figure 2:
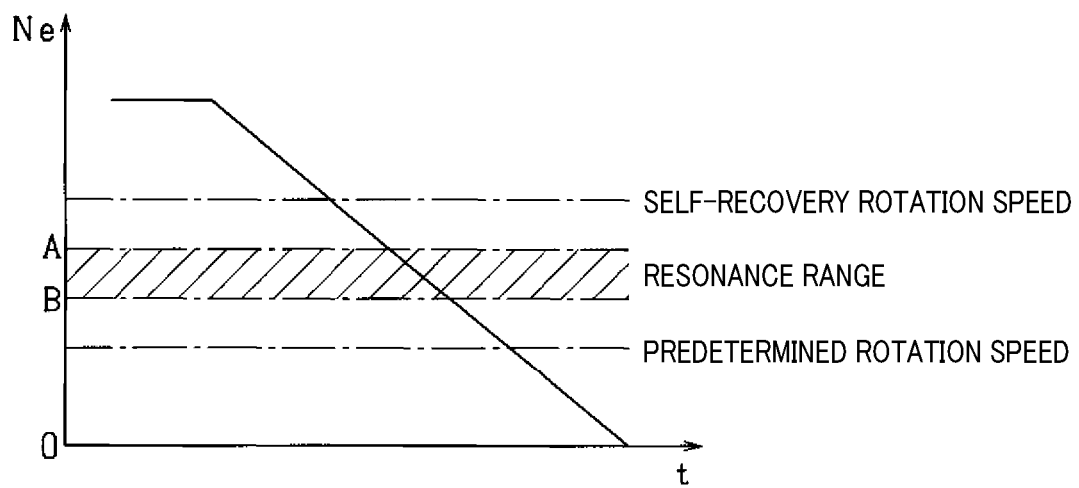
FIG. 2 is a transition chart of engine speed in a rotation drop period.

Here, in the vehicle 10, if the automatic stop conditions of the engine 11 are fulfilled from an idle state, combustion of the engine 11 is stopped. Thereafter, the engine speed Ne gradually decreases and becomes zero. FIG. 2 illustrates transition of the engine speed Ne in a rotation drop period until the engine speed Ne becomes zero after combustion of the engine 11 is stopped. According to decrease in the engine speed Ne, the engine speed Ne passes through self-recovery rotation speed, a resonance range of the engine, and predetermined rotation speed set in advance (for example, approximately 200 rpm). Here, the self-recovery rotation speed is a lower limit of rotation speed at which the engine can be restarted by supply of fuel being resumed without cranking being performed while combustion of the engine 11 is stopped, and is, for example, set to approximately 500 rpm.

The resonance range of the engine refers to a range of the engine speed in which resonance occurs, and is, for example, set to 300 to 400 rpm. Here, resonance is a phenomenon in which an excitation frequency corresponding to the engine speed is excited by matching with a resonance frequency of a power plant such as the engine body and an automatic transmission. By this phenomenon, vibration increases in the resonance range of the engine. In this manner, vibration in the resonance range is one factor of unpleasant vibration occurring when the engine is stopped.

Note that the resonance range of the engine is provided on a lower rotation side than idle rotation speed and on a higher rotation side than cranking rotation speed of a conventional starter so as to minimize vibration occurring by resonance. Therefore, the engine speed Ne passes through the resonance range during the rotation drop period until the engine speed Ne reaches zero after combustion of the engine is stopped.

Meanwhile, also immediately before rotation of the engine is stopped, vibration occurs by swing-back (inverse rotation) of the engine. This vibration occurs due to a piston being pushed back in a direction of a bottom dead center by compression reactive force within the cylinder when the engine is stopped. Note that vibration occurring in the resonance range negatively affects vibration due to this inverse rotation.

The present embodiment describes engine control in the rotation drop period until the engine speed Ne becomes zero after combustion of the engine 11 is stopped. Here, the rotation drop period is divided into three periods on the basis of the engine speed Ne. That is, a period from when combustion of the engine 11 is stopped until when the engine speed Ne reaches an upper limit of the predetermined rotation speed range including the resonance range (specifically, a boundary value A on a higher rotation side of the resonance range) is set as a first period, a period during which the engine speed Ne is within the predetermined rotation speed range is set as a second period, and a period from when the engine speed Ne passes through a lower limit of the predetermined rotation speed range (specifically, a boundary value B on a lower rotation side of the resonance range) until when the engine speed Ne becomes zero is set as a third period. In the present embodiment, engine control is performed in accordance with respective periods.

In the first period, when the automatic stop conditions are fulfilled, and combustion of the engine 11 is stopped, an opening degree of the throttle valve 22 is made larger than that in the idle rotating state. By this means, the amount of air required to restart the engine is secured.

In the second period, rotation drop processing of increasing a drop rate of the engine speed Ne in the predetermined rotation speed range including the resonance range is performed. By this means, it is possible to shorten a time period during which the engine speed Ne passes through the resonance range, so that it is possible to suppress vibration occurring due to the resonance range.

Further, in the third period, torque on the inverse rotation side (counter torque) is applied to the crank shaft 14 so that the piston 13 is stopped at a crank rotational position in a first half of the expansion stroke when rotation of the crank shaft 14 is stopped. By this means, inverse rotation of the engine is suppressed, so that it is possible to suppress vibration occurring due to the inverse rotation of the engine.

Figure 3:
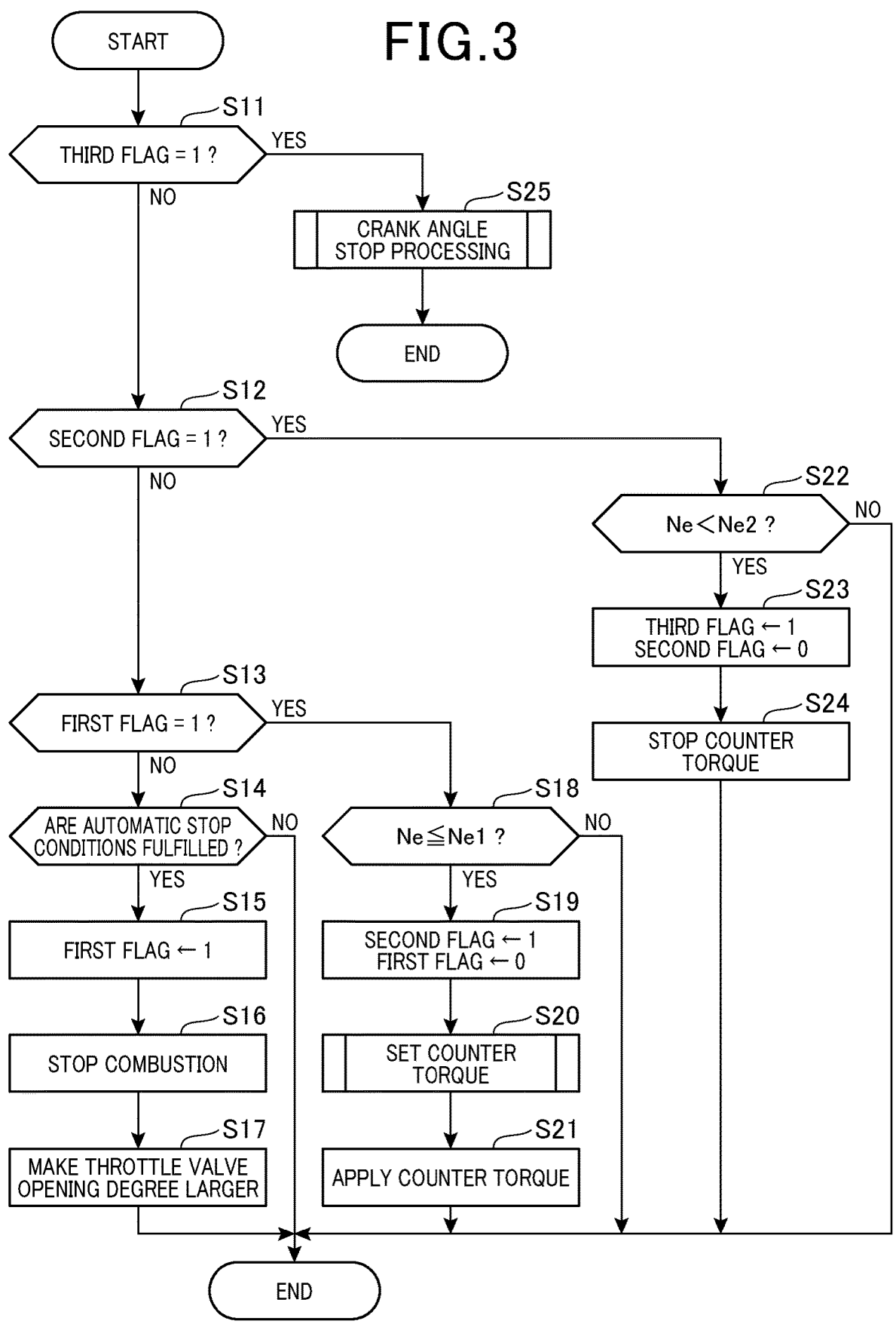
FIG. 3 is a flowchart illustrating processing of stopping engine speed.

FIG. 3 is a flowchart illustrating a processing procedure concerning engine control, and the present processing is repeatedly executed with a predetermined period (for example, 10 ms) by the ECU 50.

First, flags will be described. A first flag, a second flag and a third flag in the drawing respectively correspond to the above-described first period, second period and third period, and indicate whether or not the engine speed Ne is within each of the periods. Each of the flags indicates that the engine speed Ne is within the period in a case of "1", and indicates that the engine speed Ne is not within the period in a case of "0". Note that all the flags are set at "0" in initial setting.

In step S11, it is determined whether or not the third flag is "1". In step S12, it is determined whether or not the second flag is "1". In step S13, it is determined whether or not the first flag is "1". In the case where negative determination results are obtained in step S11 to step S13 in an initial state, the processing proceeds to step S14, and it is determined whether or not the engine automatic stop conditions are fulfilled. Then, in the case where a negative determination result is obtained in step S14, the present processing is finished without any further processing being performed.

Meanwhile, in the case where it is determined in step S14 that the engine automatic stop conditions are fulfilled, the processing proceeds to step S15, and the first flag is set to "1". In the following step S16, combustion of the engine 11 is stopped, and the processing proceeds to step S17. In step S17, the opening degree of the throttle valve 22 is made larger than the opening degree in the idle rotating state (specifically, the opening degree is made larger than the opening degree in the idle rotating state by equal to or greater than 10%, and is, for example, made full opening), and the present processing is finished.

In this manner, control is performed so that the opening degree of the throttle valve 22 is made larger than the opening degree in the idle rotating state when combustion of the engine 11 is stopped. Note that the processing in step S17 corresponds to a throttle control section.

Meanwhile, in the case where it is determined in step S13 that the first flag is "1", the processing proceeds to step S18, and it is determined whether or not the engine speed Ne is equal to or less than predetermined rotation speed Ne1 which is an upper limit of the predetermined rotation speed range. Note that, in the present embodiment, the boundary value A on the higher rotation side of the resonance range is set as the predetermined rotation speed Ne1. That is, in step S18, it is determined whether or not the engine speed Ne has reached the boundary value A on the higher rotation side of the resonance range.

In the case where it is determined in step S18 that the engine speed Ne is greater than the predetermined rotation speed Ne1, the present processing is finished without any further processing being performed. Meanwhile, in the case where it is determined in step S18 that the engine speed Ne is equal to or less than the predetermined rotation speed Ne1, that is, in the case where the engine speed Ne has transitioned to the resonance range, the processing proceeds to step S19, and the second flag is set to "1", and the first flag is reset to "0".

If the engine speed Ne has transitioned to the resonance range, processing of increasing the drop rate of the engine speed Ne is executed. As the processing of increasing the drop rate, in the present embodiment, counter torque is applied using the MG 30 which is an auxiliary device. Then, in step S20, first, the counter torque is set.

The MG 30 has a power generation function as a generator and a power driving function as an electric motor, and application of counter torque is executed using the respective functions. Here, counter torque is greater in power running driving than in regenerative power generation, and regenerative power generation excels in fuel consumption compared to power running driving. Therefore, it is preferable to use each of the functions in accordance with an operation state. In such a case, which function is used is judged on the basis of various parameters. In the present embodiment, regenerative power generation or power running driving of the MG 30 is selected in accordance with power consumption of the electric loads 36 connected to the battery 35, a state of the remaining capacity of the battery 35, required torque required for application of counter torque, and a load by operation of the auxiliary equipment 16. Further, in this case, in the case where power consumption of the electric loads 36 is large, or in the case where the load of the auxiliary equipment 16 is large, regenerative power generation is selected, and, in the case where the remaining capacity of the battery 35 is large, or in the case where the required torque of the counter torque is large, power running driving is selected.

Figure 4:
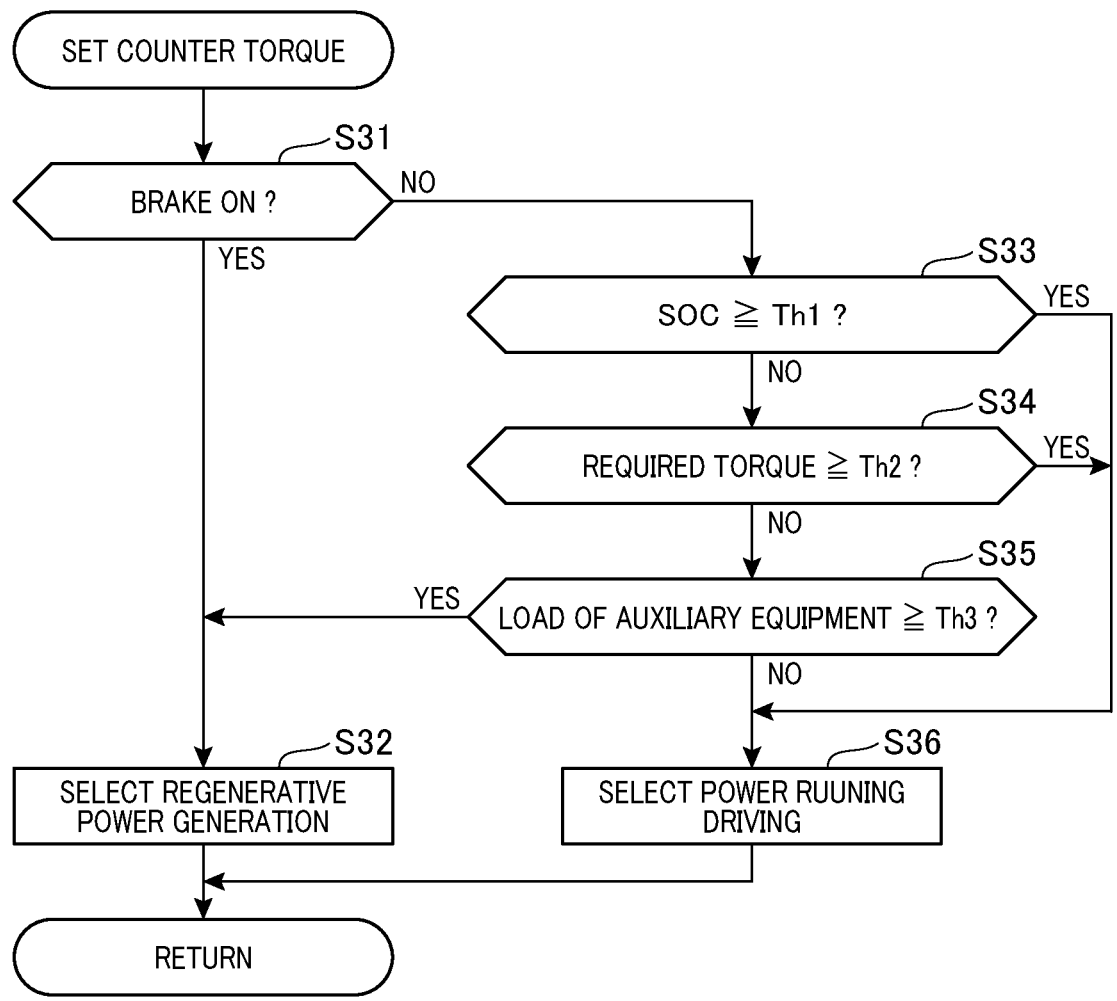
FIG. 4 is a flowchart of processing of setting counter torque.

FIG. 4 illustrates a flowchart of setting of the counter torque. First, in step S31, it is determined whether or not the power consumption of the electric loads 36 is equal to or greater than a predetermined value. For example, examples of the electric loads 36 can include, lamps, an electric pump, or the like. More specifically, it is determined whether or not a brake pedal is being depressed. Since a brake lamp is lit in a state where the brake pedal is depressed, power consumption becomes large. In the case where it is determined in step S31 that the brake pedal is being depressed, the processing proceeds to step S32, and it is determined to apply counter torque through regenerative power generation. In this case, since power consumed by the electric loads 36 is large, by utilizing regenerative power generation, it is possible to suppress vibration while reducing a burden on the battery 35.

Meanwhile, in the case where a negative determination result is obtained in step S31, the processing proceeds to step S33, and a function is selected depending on the remaining capacity of the battery 35. Here, for example, it is determined whether or not the SOC of the battery 35 is equal to or greater than a threshold Th1. In the case where it is determined in step S33 that the SOC is equal to or greater than the threshold Th1, the processing proceeds to step S36, and it is determined to apply counter torque through power running driving. Note that a value of the threshold Th1 may be changed as appropriate, and, for example, may be a value from which it can be judged that the battery 35 is in a fully charged state if the SOC is equal to or greater than the threshold Th1.

Here, in calculation of the SOC, an estimation method based on an open circuit voltage (OCV) and a calculation method through current integration are used. Here, an open circuit voltage of the battery 35 is acquired, the SOC is estimated using the acquired value and a map indicating the correspondence relationship between the open circuit voltage and the SOC, a charge/discharge current flowing through the battery 35 is acquired, and the SOC is calculated by performing calculation processing on the acquired value. Note that, in the case where counter torque is applied through power running driving, greater counter torque may be set as the remaining capacity is greater. In this case, since it is possible to further shorten a time period during which the engine speed Ne passes through the resonance range, it can be considered that an effect of suppressing vibration is improved.

Meanwhile, in the case where a negative determination result is obtained in step S33, the processing proceeds to step S34, and a function is selected depending on the required torque of the counter torque. For example, it is determined whether or not the required torque is equal to or greater than a threshold Th2. In the case where it is determined in step S34 that the required torque is equal to or greater than the threshold Th2, the processing proceeds to step S36, and it is determined to apply counter torque through power running driving.

Further, in the case where a negative determination result is obtained in step S34, the processing proceeds to step S35, and a function is selected depending on the load of the auxiliary equipment 16. For example, it is determined whether or not the load from operation of the auxiliary equipment 16 is equal to or greater than a threshold Th3. In the case where it is determined in step S35 that the load is equal to or greater than the threshold Th3, the processing proceeds to step S32, and it is determined to apply counter torque through regenerative power generation. Note that, while, in such a case, power consumption of the electric loads 36 is less than a predetermined value (step S31: No), regenerative power generation is selected in view of other parameters indicating an operation state of the vehicle.

Meanwhile, in the case where a negative determination result is obtained in step S35, the processing proceeds to step S36, and it is determined to apply counter torque through power running driving. As described above, after regenerative power generation or power running driving is determined on the basis of the parameters, the processing transitions to step S21 in FIG. 3, and counter torque is applied. Note that it is also possible to employ a configuration in which, in the case where the result in step S31 is No, the processing proceeds to step S36, and power running driving is selected without determination in step S33 to step S35 being performed. That is, it is also possible to employ a configuration in which, in the case where the power consumption of the electric load 36 is less than the predetermined value, counter torque is applied through power running driving.

Here, application of counter torque through power running driving corresponds to first rotation drop processing, and application of counter torque through regenerative power generation corresponds to second rotation drop processing.

Then, in the case where it is determined in step S12 in FIG. 3 that the second flag is "1", the processing proceeds to step S22, and it is determined whether or not the engine speed Ne is less than predetermined rotation speed Ne2 which is a lower limit of the predetermined rotation speed range. Note that, in the present embodiment, the boundary value B on the lower rotation side of the resonance range is set as the predetermined rotation speed Ne2. That is, in step S22, it is determined whether or not the engine speed Ne has passed through the boundary value B on the lower rotation side of the resonance range.

In the case where it is determined in step S22 that the engine speed Ne is less than the predetermined rotation speed Ne2, that is, in the case where the engine speed Ne has transitioned to the third period, the processing proceeds to step S23, and the third flag is set to "1", and the second flag is reset to "0". In the following step S24, the counter torque applied in step S21 is stopped. Meanwhile, in the case where it is determined in step S22 that the engine speed Ne is equal to or greater than the predetermined rotation speed Net, the present processing is finished without any further processing being performed.

Note that the processing in step S18 and step S22 corresponds to a resonance range determining section which determines that the engine speed passes through the resonance range of the engine. Further, the processing in step S20 and step S21 corresponds to a rotation drop control section. In this manner, in the present embodiment, in the case where it is determined that the engine speed passes through the resonance range, counter torque is applied to the engine output shaft by using either power running driving or regenerative power generation of the rotating electrical machine.

Figure 5:
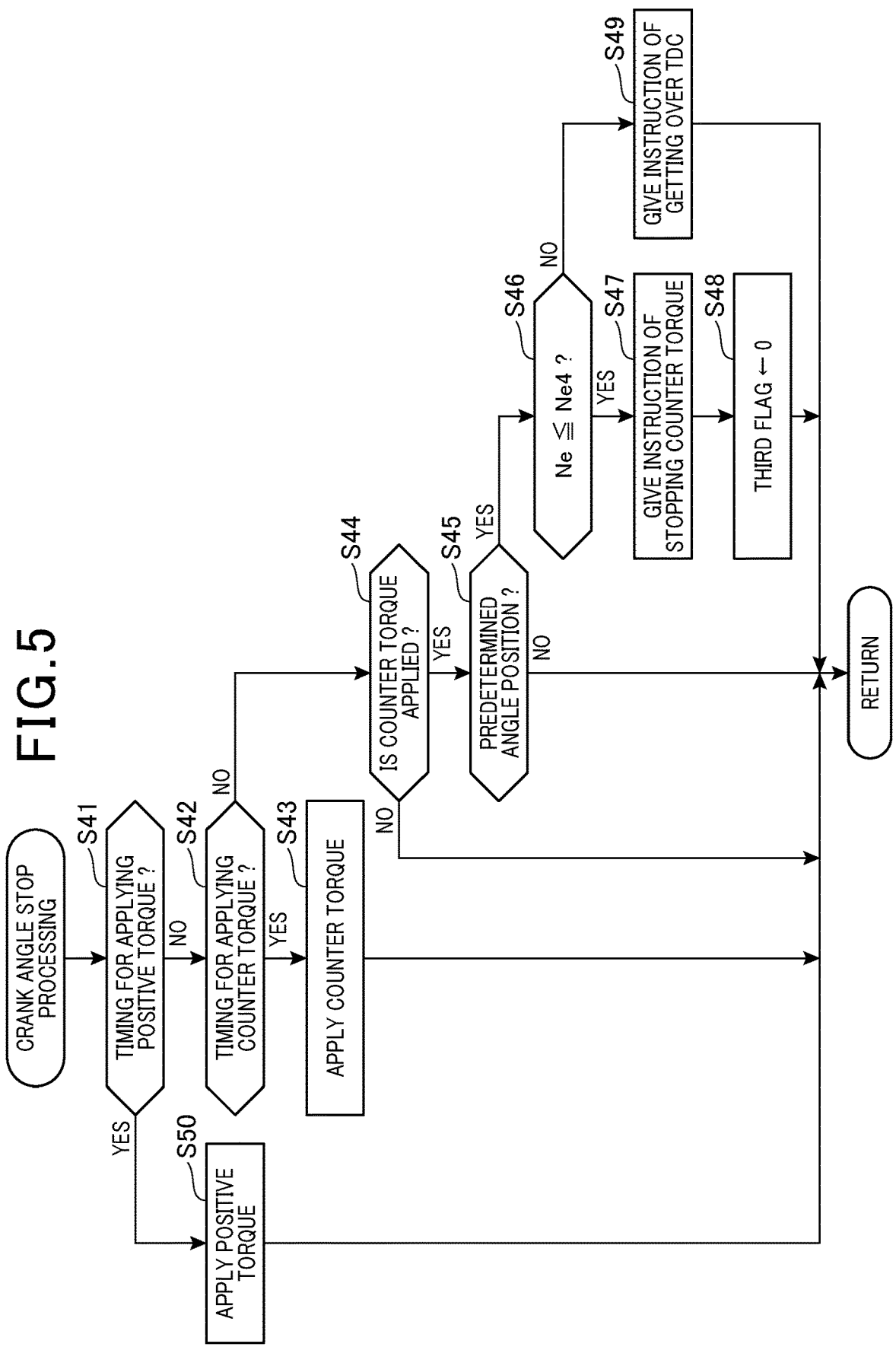
FIG. 5 is a flowchart of crank angle stop processing.

Then, in the case where it is determined in step S11 that the third flag is "1", the processing proceeds to step S25, and processing of a subroutine illustrated in FIG. 5 is executed. That is, when the engine speed Ne transitions to the third period, crank angle stop processing for suppressing inverse rotation of the engine is performed. Here, counter torque is applied at predetermined timing based on the engine speed so that the piston 13 is stopped at a position in a first half of an expansion stroke, that is, the piston 13 of the next combustion cylinder is stopped at a position in a first half of a compression stroke. Further, in the case where the piston 13 is not stopped at a desired position by application of counter torque, backup processing of applying torque on a positive rotation side (positive torque) to the engine output shaft is also executed. That is, in the crank angle stop processing, control is performed so that the piston 13 is not stopped at a position in a second half of a compression stroke, that is, the piston 13 is not stopped at a position at which compression reactive force is generated.

In step S41 in FIG. 5, first, it is determined whether or not it is timing for applying positive torque to the engine output shaft. In this step, an affirmative determination result is obtained in the case where it is determined to execute backup processing, and a negative determination result is obtained in step S41 in initial setting. In the following step S42, it is determined whether or not it is timing for applying counter torque to the engine output shaft. In the present embodiment, for example, in the case where the engine speed Ne when the piston 13 is located at a compression TDC is equal to or less than predetermined rotation speed Ne3, it is determined that it is timing for applying counter torque. Here, in the case where it is determined that it is timing for applying counter torque, the processing proceeds to step S43, counter torque is applied to the engine output shaft, and the present processing is finished.

The predetermined rotation speed Ne3 is rotation speed at which it is determined that rotation of the engine output shaft is stopped until the piston passes through a first half period of the expansion stroke by counter torque being applied from timing at which the piston is located at the compression TDC. Note that the predetermined rotation speed Ne3 is set as a value smaller than the predetermined rotation speed Net which is the lower limit of the predetermined rotation speed range.

Meanwhile, in the case where it is determined in step S42 that it is not timing for applying counter torque, the processing proceeds to step S44, and it is determined whether or not counter torque is applied. Here, in the case where a negative determination result is obtained in step S44, the present processing is finished without any further processing being performed.

Meanwhile, in the case where it is determined in step S44 that counter torque is applied, the processing proceeds to step S45, and it is determined whether or not the crank rotational position detected by the crank angle sensor 51 is a set predetermined angle (for example, ATDC70° CA). In the case where it is determined that the rotational position is the predetermined angle, the processing proceeds to step S46, and it is determined whether or not the engine speed Ne is equal to or less than predetermined rotation speed Ne4. Meanwhile, in the case where a negative determination result is obtained in step S45, the present processing is finished without any further processing being performed.

In the case where it is determined in step S46 that the engine speed Ne is equal to or less than the predetermined rotation speed Ne4, that is, in the case where it is determined that the piston 13 is stopped at a position in the first half of the expansion stroke, the processing proceeds to step S47, and an instruction of stopping the counter torque applied in step S43 is given. By this means, the counter torque applied to the engine output shaft is stopped. Subsequently, the processing proceeds to step S48, the third flag is reset to "0", and the present processing is finished.

Note that step S45 and step S46 correspond to a stop determining section. The predetermined rotation speed Ne4 at the predetermined angle can be arbitrarily changed, and only has to be a value from which it can be determined whether or not the piston 13 is actually stopped at the crank rotational position up to the first half of the expansion stroke after the counter torque is applied in step S43.

Meanwhile, in the case where it is determined in step S46 that the engine speed Ne is greater than the predetermined rotation speed Ne4, that is, in the case where it is determined that the piston 13 is not stopped at the position in the first half of the expansion stroke, the processing proceeds to step S49, and an instruction for allowing the piston 13 to get over the next compression TDC is given. That is, it is judged to execute backup processing. Then, in the present embodiment, in the case where this processing is executed, and the crank rotational position is located at the predetermined rotation angle (for example, ATDC90° CA), it is determined that it is timing for applying positive torque to the engine output shaft (step S41: Yes).

If an affirmative determination result is obtained in step S41, the processing proceeds to step S50, positive torque is applied, and the present processing is finished. Thereafter, the processing proceeds to step S42 again, and the crank angle stop processing is executed until the third flag is finally reset to "0".

Figure 6:
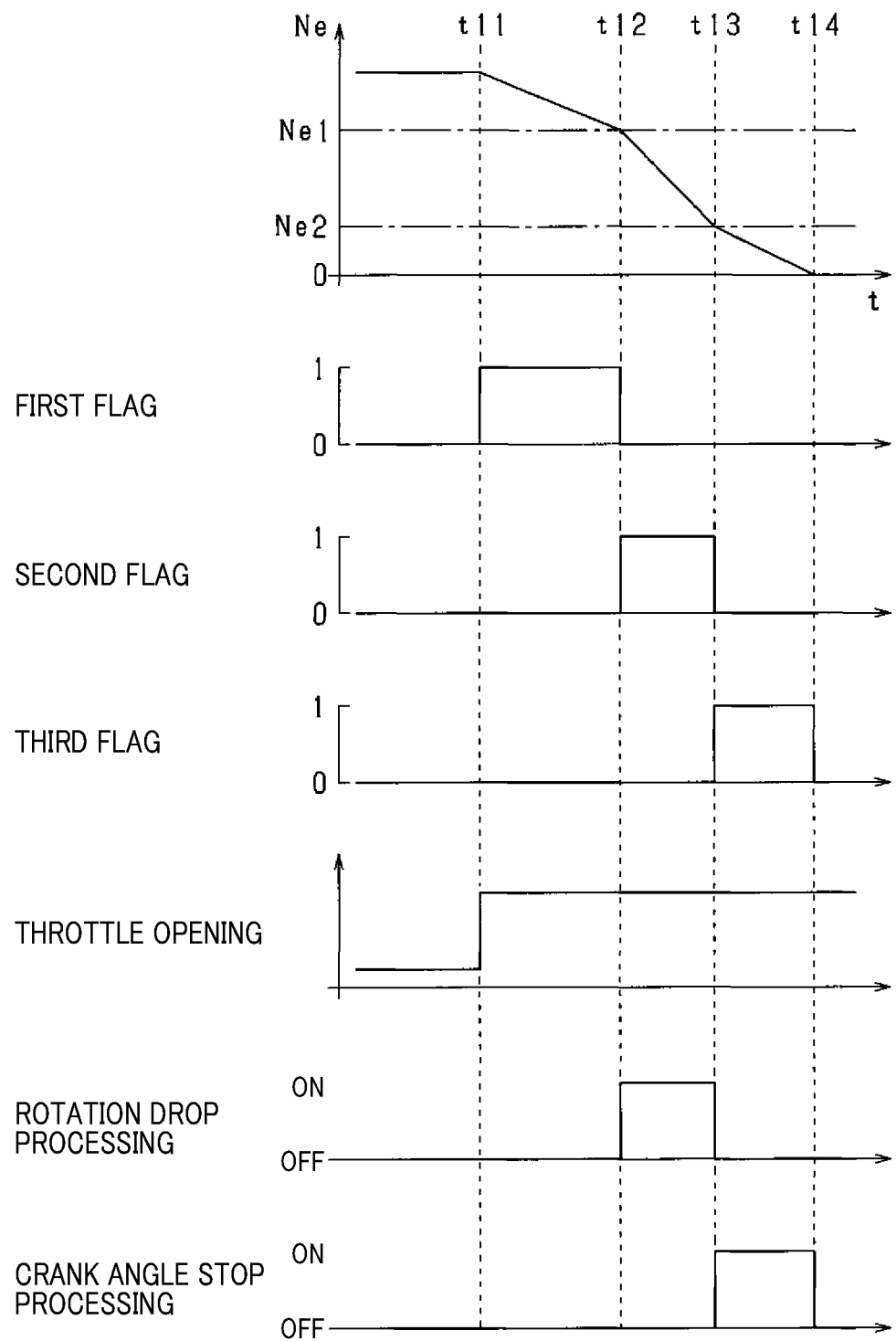
FIG. 6 is a timing diagram illustrating an aspect of the processing of stopping engine speed.

Next, engine control in the rotation drop period until the engine speed Ne completely becomes zero after combustion of the engine 11 is stopped will be described with reference to a timing diagram in FIG. 6.

First, if the automatic stop conditions are fulfilled at timing t11 from the idle state, the first flag is set to "1". At this time, the opening degree of the throttle valve 22 is controlled to be larger than the opening degree in the idle state. Thereafter, if the engine speed Ne becomes equal to or less than the predetermined rotation speed Ne1 at timing t12, at the same time as the second flag being set to "1", the first flag is reset to "0". At this time, counter torque is applied to the engine output shaft as the rotation drop processing. Then, if the engine speed Ne falls below the predetermined rotation speed Net at timing t13, at the same time as the third flag being set to "1", the second flag is reset to "0". At this time, the rotation drop processing is stopped, and in the following third period, the crank angle stop processing is executed. Then, the engine speed Ne becomes zero at timing t14.

Subsequently, the crank angle stop processing in the case where the engine speed Ne is within the third period will be described with reference to timing diagrams in FIG. 7 and FIG. 8. These respectively illustrate cases of different determination results in step S46 in FIG. 5 after counter torque is applied. FIG. 17 illustrates a case where an affirmative determination result is obtained in step S46, and only counter torque is applied in the third period, while FIG. 8 illustrates a case where a negative determination result is obtained in step S46, and, in addition to counter torque, positive torque is also applied in the third period. Note that these drawings illustrate change of an in-cylinder pressure of each cylinder. The in-cylinder pressure increases as the piston 13 comes closer to the compression TDC, and becomes a maximum at the compression TDC. Further, a local maximum value of the in-cylinder pressure decreases as the engine speed Ne decreases. Note that firing order of the respective cylinders is #1, #2, #3 and #4 for the purpose of illustration.

Figure 7:
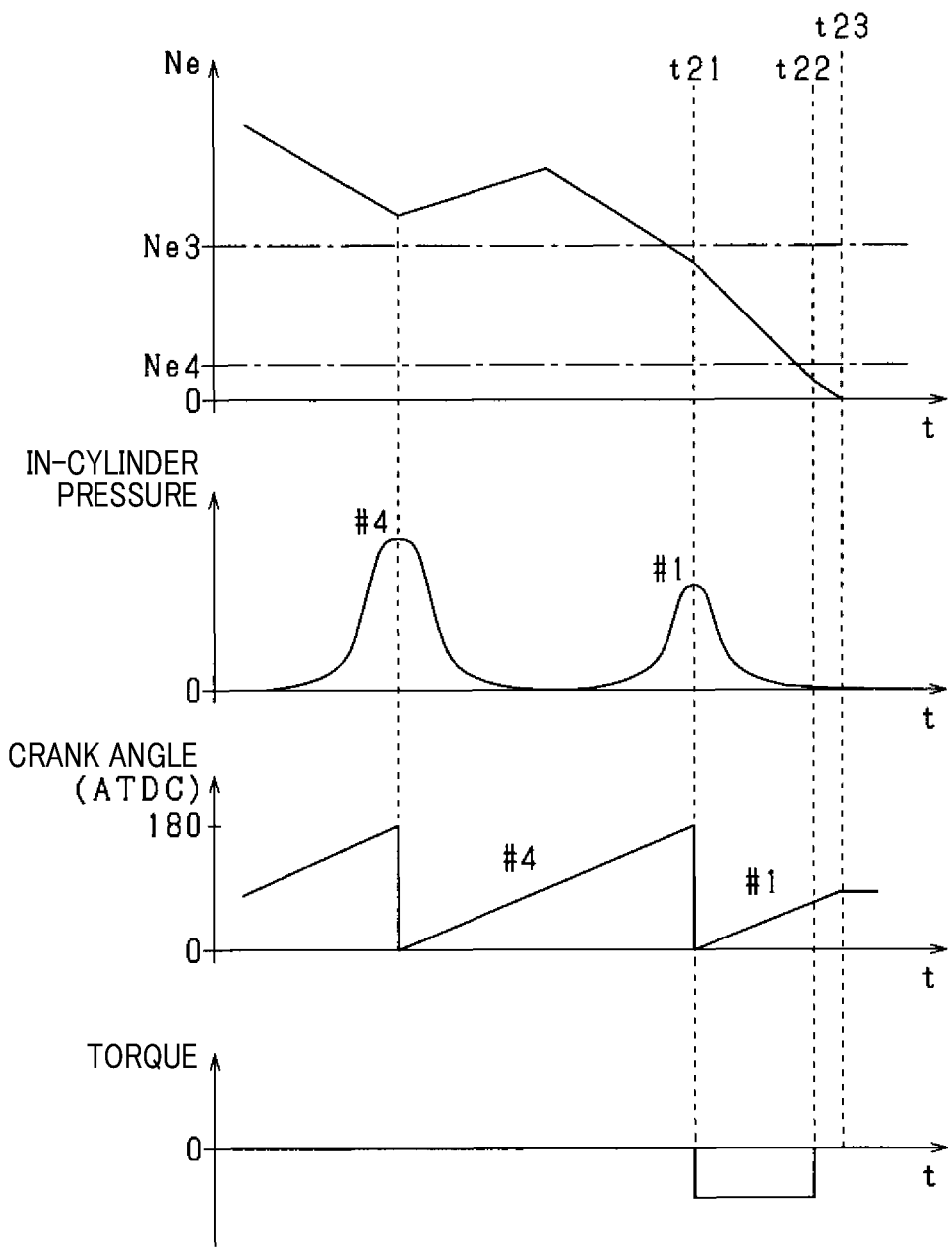
FIG. 7 is a timing diagram illustrating an aspect of the crank angle stop processing.
Figure 8:
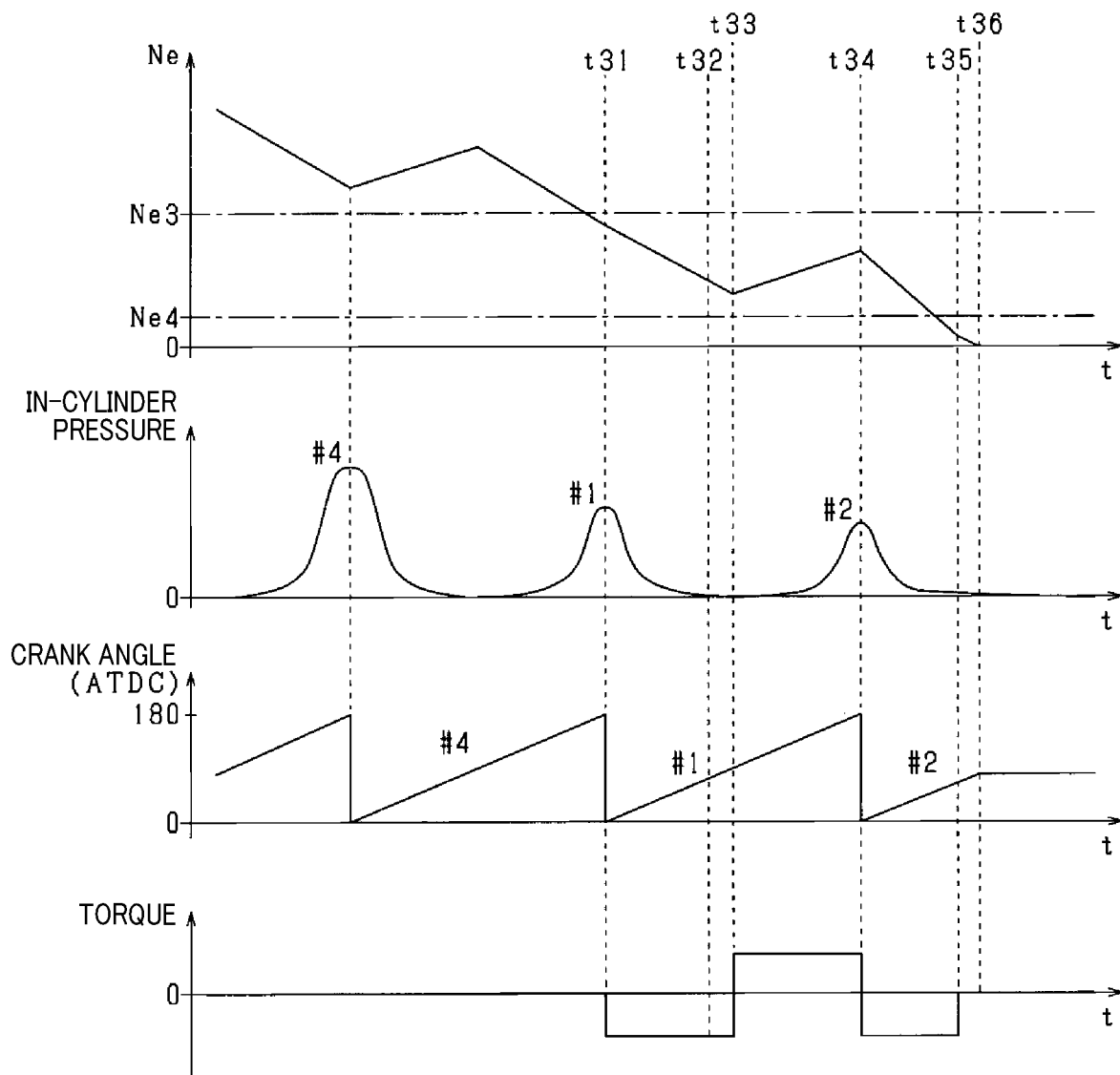
FIG. 8 is a timing diagram illustrating an aspect of the crank angle stop processing.

In FIG. 7, while the engine speed Ne drops, when the engine speed Ne becomes equal to or less than Ne3 at timing t21 (at timing at which a first cylinder (#1) reaches the compression TDC), counter torque is applied to the engine output shaft, which leads to increase in a drop rate of the engine speed Ne, and the engine speed Ne approaches zero. Then, when the engine speed Ne at timing t22 (at timing at which the first cylinder (#1) reaches a predetermined crank angle position (for example, ATDC70° CA)) becomes equal to or less than the predetermined rotation speed Ne4, application of the counter torque is stopped. Thereafter, rotation of the engine 11 is stopped at timing t23. At this time, the piston 13 of the first cylinder (#1) is stopped at a position in the first half of the expansion stroke (for example, ATDC80° CA).

In FIG. 8, when the engine speed Ne becomes equal to or less than Ne3 at timing t31 (at timing at which the first cylinder (#1) reaches the compression TDC), counter torque is applied. Then, when the engine speed Ne at timing t32 (at timing at which the first cylinder (#1) reaches a predetermined crank angle position (for example, ATDC70° CA)) is greater than the predetermined rotation speed Ne4, backup processing is executed. That is, at timing t33, positive torque is applied so that the second cylinder (#2) can get over the next compression TDC. Here, the timing t33 is set to timing at which the first cylinder (#1) is located at a predetermined crank angle position (for example, ATDC90° CA).

Then, when the engine speed Ne becomes equal to or less than the predetermined rotation speed Ne3 again at timing t34 at which the second cylinder (#2) reaches the compression TDC, counter torque is applied again. Thereafter, when the engine speed Ne at timing t35 (at timing at which the second cylinder (#2) reaches a predetermined crank angle position (for example, ATDC70° CA)) becomes equal to or less than the predetermined rotation speed Ne4, application of the counter torque is stopped. Then, rotation of the engine 11 is stopped at timing t36, and at that time, the second cylinder (#2) is stopped at a position in the first half of the expansion stroke (for example, ATDC80° CA).

In the present embodiment, a four-cylinder engine is described as a multi-cylinder engine. In such a case, when the piston 13 in one cylinder is stopped at a position in the first half period of the stroke process, the pistons 13 in other cylinders are not stopped at a position in the second half period of the compression stroke, that is, at a position at which compression reactive force is generated.

According to the present embodiment described in detail above, it is possible to obtain the following advantageous effects.

In a vehicle having an idling stop function, when combustion of the engine 11 is stopped, by making the opening degree of the throttle valve 22 larger than the opening degree in the idle rotating state, it is possible to secure a sufficient amount of air required when the engine restarts. Further, by applying counter torque by using the MG 30 so that a drop rate of the engine speed is increased in the resonance range, it is possible to shorten a time period during which the engine speed passes through the resonance range. In this case, while there is a concern that vibration is increased in the resonance range in a state where the throttle opening degree is large, by shortening the time period during which the engine speed passes through the resonance range, it is possible to suppress the increase in vibration. By this means, in a vehicle having an idling stop function, it is possible to secure startability when the engine restarts while suppressing occurrence of vibration when the engine is automatically stopped.

A configuration is employed in which the opening degree of the throttle valve 22 is made larger than the opening degree in the idle rotating state at a time point at which combustion of the engine 11 is stopped. By this means, even in the case where restart conditions are fulfilled immediately after combustion is stopped, it is possible to secure a sufficient amount of air, so that startability when the engine restarts becomes favorable.

A configuration is employed in which, in the resonance range, counter torque is applied by using the MG 30. In this case, it is possible to apply greater counter torque to the engine output shaft compared to torque applied by using the auxiliary equipment 16. Therefore, a time period during which the engine speed passes through the resonance range is further shortened, so that an effect of suppressing vibration is improved.

Further, a configuration is employed in which, in application of counter torque using the MG 30, regenerative power generation or power running driving can be selected. Here, counter torque is greater in power running driving than in regenerative power generation, and regenerative power generation excels in fuel consumption compared to power running driving. By this means, it is possible to select a drive system while taking respective advantages of regenerative power generation and power driving in accordance with an operation state.

A configuration is employed in which, concerning selection of the drive system of the MG 30, regenerative power generation or power running driving can be selected depending on power consumption of the electric loads 36 connected to the battery 35. In this case, in the case where power consumption of the electric loads 36 is equal to or greater than a predetermined value, since the battery 35 is burdened, counter torque is applied through regenerative power generation. By this means, it is possible to suppress vibration while maintaining a stable power supply state of the battery 35.

Specifically, a configuration is employed in which, in a case of a state where a brake pedal is depressed, counter torque is applied while regenerative power generation is selected. In a state where the brake pedal is depressed, power consumption of the battery 35 increases in association with lighting of a brake lamp. Therefore, it is possible to suppress vibration while maintaining a stable power supply state of the battery 35.

Concerning selection of the drive system of the MG 30, further, a configuration is employed in which regenerative power generation or power running driving can be selected on the basis of the remaining capacity of the battery 35. In this case, in the case where the remaining capacity is equal to or greater than the threshold Th1, counter torque is applied through power running driving. In the case where there is large remaining capacity of the battery 35, there is a concern that the battery 35 is overcharged by the rotating electrical machine being caused to perform regenerative power generation. Concerning this point, by counter torque being applied through power running driving, it is possible to suppress vibration occurring due to the resonance range without damaging the battery 35.

In the case where it is determined that the cylinder is located at a compression top dead center immediately before the engine speed becomes zero in the third period, counter torque is applied from the compression top dead center by using the MG 30. In this case, by applying counter torque, it is possible to stop the piston 13 at a position in the first half of the expansion stroke. By this means, by suppressing occurrence of inverse rotation of the engine, it is possible to reduce vibration in association with the inverse rotation of the engine.

Specifically, it is determined that the cylinder is located at the last compression top dead center on the basis that the engine speed at the compression top dead center of the engine 11 is equal to or less than a predetermined value. Here, the predetermined value is a value from which it is determined that the piston 13 is stopped at the position in the first half of the expansion stroke by application of the counter torque. Therefore, it is possible to stop the piston 13 at a desired position, so that it is possible to reduce vibration in association with the inverse rotation of the engine.

Further, a configuration is employed in which a stop determining section is provided which determines whether or not the piston 13 is actually stopped at a desired position after the counter torque is applied, and, in the case where it is determined that the piston 13 is stopped at the desired position, application of the counter torque is stopped. In this case, when rotation of the engine is stopped at a position in the first half of the expansion stroke, application of the counter torque is cancelled. By this means, it is possible to prevent inverse rotation of the engine due to counter torque.

Further, backup processing is provided in stop control in the third period. That is, in the case where it is determined by the stop determining section that the piston 13 is not stopped at a desired position, positive torque is applied once so that the piston 13 can get over the next compression TDC. Then, when the cylinder reaches the compression TDC, processing of applying counter torque again from that point, and stopping the piston at the position in the first half of the expansion stroke is performed. By this means, it is possible to stop the piston 13 at the position in the first half of the expansion stroke more reliably, so that it is possible to improve an effect of suppressing vibration.

After combustion of the engine 11 is stopped, in the rotation drop period until the engine speed drops to zero, counter torque is applied in the resonance range, and counter torque by crank stop processing or positive/counter torque is applied in the third period, by using the MG 30. By this means, it is possible to suppress also vibration in association with the inverse rotation of the engine as well as vibration in the resonance range. Further, in this case, it is possible to reduce an adverse effect of vibration in the resonance range on vibration due to the inverse rotation. In this manner, by combining application of counter torque in the resonance range and the processing in the third period, it is possible to synergistically suppress vibration occurring from when combustion of the engine 11 is stopped until when rotation of the engine 11 is stopped.

The present disclosure is not limited to the above-described embodiment, and, for example, may be implemented as below.

While, in the above-described embodiment, a configuration is employed where counter torque is applied by using the MG 30 as the auxiliary device, any auxiliary device which can apply counter torque to the engine output shaft may be used. Examples of the auxiliary device can include, for example, the auxiliary equipment 16 such as a water pump and a fuel pump. In this case, also in a vehicle in which the MG 30 is not installed, it is possible to apply counter torque by using a device which is normally provided to the vehicle. Therefore, it is not necessary to separately provide an additional device, which is economical.

In the above-described embodiment, counter torque is applied in the second period assuming that the predetermined rotation speed range is the resonance range. That is, an upper limit of the predetermined rotation speed range is set as the boundary value A on the higher rotation side of the resonance range, and a lower limit of the predetermined rotation speed range is set as the boundary value B on the lower rotation side of the resonance range. Concerning this point, any configuration may be employed if the predetermined rotation speed range is set so as to include the resonance range.

For example, it is also possible to employ a configuration in which the predetermined rotation speed range is determined while setting the predetermined rotation speed on the higher rotation side of the resonance range as the upper limit. In this case, it is determined in step S18 in FIG. 3 whether or not the engine speed Ne is equal to or less than the predetermined rotation speed Ne1 set on the higher rotation side of the boundary value A of the resonance range, and if the determination result in step S18 is Yes, application of counter torque is started. According to this configuration, after combustion of the engine 11 is stopped, by counter torque being applied before the engine speed reaches the resonance range, it is possible to improve response to a drop rate by the counter torque near the boundary value A of the resonance range. As a result, the time period during which the engine speed passes through the resonance range is further shortened, so that an effect of suppressing vibration is improved.

Further, it is also possible to employ a configuration in which the predetermined rotation speed range is determined while setting the self-recovery rotation speed on the higher rotation side of the resonance range as the upper limit. In this case, it is determined in step S18 in FIG. 3 whether or not the engine speed Ne is equal to or less than the predetermined rotation speed Ne1 set at the self-recovery rotation speed, and in the case where the determination result in step S18 is Yes, application of counter torque is started. According to this configuration, in a state where the engine speed exceeds the predetermined rotation speed Ne1 which is an early stage in which the engine speed starts to drop in association with stop of combustion of the engine, it is possible to expect a possibility that the engine is autonomously recovered without the drop rate of the engine speed being increased. As a result, it is possible to improve response to the drop rate in the resonance range and improve an effect of suppressing vibration while reducing power consumption required for restart.

In addition to the above configurations, it is also possible to employ a configuration in which the predetermined rotation speed range is determined while setting the predetermined rotation speed set in advance on the lower rotation side of the resonance range as the lower limit. In this case, it is determined in step S22 in FIG. 3 whether or not the engine speed Ne is less than the predetermined rotation speed Net set in advance, and in the case where the determination result in step S22 is Yes, application of the counter torque is stopped. According to this configuration, it is possible to expect a possibility that the engine is restarted by cranking without the drop rate of the engine speed being increased during a period during which the engine speed is within a range between the predetermined rotation speed set in advance and zero. As a result, it is possible to secure startability of restart while suppressing vibration in the resonance range.

Further, it is also possible to set the predetermined rotation speed range by combining settings of the above-described upper limit and lower limit of the predetermined rotation speed range. For example, it is possible to set the upper limit of the predetermined rotation speed range as the self-recovery rotation speed on the higher rotation side of the resonance range and set the lower limit as the predetermined rotation speed set in advance on the lower rotation side of the resonance range. In such a case, it is possible to make the engine speed promptly pass through the rotation speed range in which the engine cannot be restarted by means of fuel supply or cranking. Meanwhile, in a range in which the engine can be restarted, a drop rate of the engine speed is not increased. As a result, it is possible to secure startability of restart while suppressing vibration in the resonance range.

While, in the above-described embodiment, a configuration is employed in which, concerning application of counter torque in the resonance range, regenerative power generation or power running driving of the MG 30 is selected in accordance with power consumption of the electric loads 36 connected to the battery 35, the state of the remaining capacity of the battery 35, the required torque required for application of counter torque, and the load by operation of the auxiliary equipment 16, it is also possible to employ a configuration in which regenerative power generation or power running driving is selected in accordance with other parameters. Examples of other parameters can include rotation speed, and the like, of the MG 30.

Note that, in selection of the drive system of the MG 30, priorities may be set on the above-described parameters. For example, determination based on a driving state of the electric loads 36 may be taken on the top priority, and, subsequently, priorities may be set in order of the state of the remaining capacity of the battery 35, the required torque required for application of counter torque, and the load by operation of the auxiliary equipment 16.

While, in the above-described embodiment, the SOC of the battery 35 is used as the state of the remaining capacity of the battery 35, the state of the remaining capacity of the battery 35 is not limited to this, and, for example, a voltage between the terminals of the battery 35 may be used.

In the above-described embodiment, a configuration is employed in which, in the case where it is determined that the power consumption of the electric loads 36 is equal to or greater than a predetermined value, specifically, in the case where the brake pedal is being depressed, counter torque is applied through regenerative power generation. Concerning this point, it is, for example, also possible to employ a configuration in which, in the case where it is determined that the power consumption of the electric loads 36 is less than a predetermined value, specifically, in the case where the brake pedal is not being depressed, counter torque is applied through power running driving. In this case, since power consumption by the electric loads 36 is small, it is possible to suppress the total amount of electric power even if power running driving is performed. Further, by utilizing power running driving, it is possible to make the engine speed pass through the resonance range in a shorter time period. By this means, it is possible to effectively suppress vibration.

Concerning the backup processing in the third period, while, in FIG. 8, a configuration is employed in which counter torque is applied in a period from the timing t31 to the timing t33, it is also possible to employ a configuration in which counter torque is stopped at a time point at which stop is determined at the timing t32.

Further, in FIG. 8, a configuration is employed in which positive torque is applied in a period from the timing t33 to the timing t34 (a timing at which the second cylinder (#2) reaches the compression TDC). Concerning this point, a period during which positive torque is applied is not limited to this, and it is only necessary to employ a configuration in which positive torque is applied so that the piston (here, the second cylinder (#2)) can get over the compression TDC, and it is also possible to employ a configuration in which application of the positive torque is stopped before the compression TDC.

The magnitude of the counter torque applied in the crank angle stop processing only has to be determined in advance as the amount of torque required for stopping the piston 13 at the position in the first half of the expansion stroke. Further, it is also possible to provide a means for predicting a stop position of the piston 13 every moment when rotation of the engine is stopped, and apply counter torque while performing feedback control of adjusting the amount of torque on the basis of the predicted stop position.

The magnitudes of the counter torque and the positive torque applied in the crank angle stop processing may be changed as appropriate, and may be the same or different from each other. Further, magnitudes of first counter torque and second counter torque in the case where backup processing is performed may be changed as appropriate. For example, the second counter torque may be set greater than the first counter torque, and according to this configuration, it can be considered that the piston can be stopped at a desired position more reliably.

In the above-described embodiment, in the crank angle stop processing, timing for applying counter torque is judged based on whether or not the engine speed Ne at the compression TDC falls below the predetermined rotation speed Ne3. Concerning this point, the crank angle position at which the predetermined rotation speed Ne3 is set is not limited to the compression TDC, and the judging may be performed while the engine speed Ne at another crank angle position being set as the threshold. Note that, in this case, it is also possible to employ a configuration in which application of counter torque is started from the crank angle position at which the threshold is set.

While, in the above-described embodiment, in the crank angle stop processing, the predetermined rotation speed Ne3 is provided as the threshold for the engine speed to judge timing for applying counter torque, the judging method is not limited to this method. For example, it is also possible to use a method of judging the timing from a transition of drop of the engine speed Ne. In this case, the ECU 50, for example, calculates a rotation speed drop amount ΔNe from the engine speed Ne for each compression TDC and estimates a compression TDC (i) at which it is predicted that the engine speed Ne falls below zero. Then, it is possible to set timing at which the piston 13 reaches a compression TDC (i-1) immediately before the compression TDC (i) as timing for applying counter torque.

The above-described control in the rotation drop period until the engine speed becomes zero may be performed in a case of stop by ignition switch operation by the driver as well as in a case of automatic stop of the engine. Further, the above-described control may be also performed in a case of stop in a vehicle which does not have an idling stop function.

While the present disclosure has been described with reference to the examples, the present disclosure is not limited to the examples and structures thereof. The present disclosure includes various modified examples and modifications within an equivalent range. In addition, various combinations, forms, and other combinations and forms including only one element or more or less elements therein fall within the scope and the spirit of the present disclosure.

The invention claimed is:

1. An engine stop/start control apparatus which is applied to an engine in which a throttle valve is provided to an intake part, and which automatically stops the engine in association with fulfillment of a predetermined automatic stop condition, and, thereafter restarts the engine in association with fulfillment of a predetermined restart condition, the engine stop/start control apparatus comprising:
   a throttle control section configured to maintain an opening degree of the throttle valve larger than an opening degree in an idle rotating state of the engine in a rotation drop period until engine speed drops to zero after combustion of the engine is stopped due to the automatic stop of the engine;
   a resonance range determining section configured to determine that the engine speed is within a predetermined rotation speed range including at least a resonance range of the engine in the rotation drop period; and
   a rotation drop control section configured to, in a case where it is determined that the engine speed is within the predetermined rotation speed range, perform rotation drop processing of temporarily increasing a drop rate of the engine speed.

2. The engine stop/start control apparatus according to claim 1,
   wherein the engine stop/start control apparatus is applied to a system including an auxiliary device which is capable of applying counter torque, which is torque on an inverse rotation side, to an engine output shaft, and
   the rotation drop control section applies counter torque to the engine output shaft by the auxiliary device as the rotation drop processing.

3. The engine stop/start control apparatus according to claim 2,
   wherein the auxiliary device is a rotating electrical machine which is drive-coupled to the engine output shaft, and which has functions of power generation and power driving.

4. The engine stop/start control apparatus according to claim 3, wherein the rotation drop control section is further configured to, in the case where it is determined that the engine speed is within the predetermined rotation speed range, perform rotation drop processing of temporarily increasing a drop rate of the engine speed by way of the rotating electrical machine applying the counter torque to the engine output.

5. The engine stop/start control apparatus according to claim 1,
wherein the predetermined rotation speed range is determined such that predetermined rotation speed on a higher rotation side of the resonance range is set as an upper limit, and
the rotation drop control section starts the rotation drop processing in a case where it is determined by the resonance range determining section that the engine speed is equal to or less than the upper limit.

6. The engine stop/start control apparatus according to claim 1,
wherein self-recovery rotation speed is determined as engine speed at which the engine is able to be autonomously recovered after combustion of the engine is stopped,
the predetermined rotation speed range is determined such that self-recovery rotation speed of the engine on a higher rotation side of the resonance range is set as an upper limit, and
the rotation drop control section does not perform the rotation drop processing in a case where it is determined by the resonance range determining section that the engine speed is greater than the upper limit, and starts the rotation drop processing in a case where it is determined by the resonance range determining section that the engine speed is equal to or less than the upper limit.

7. The engine stop/start control apparatus according to claim 1,
wherein the predetermined rotation speed range is determined such that predetermined rotation speed set in advance on a lower rotation side of the resonance range is set as a lower limit, and
the rotation drop control section stops the rotation drop processing in a case where it is determined by the resonance range determining section that the engine speed is less than the lower limit.

8. The engine stop/start control apparatus according to claim 1,
wherein the throttle control section makes the opening degree of the throttle valve larger than the opening degree in the idle rotating state at a time point at which combustion of the engine is stopped in association with fulfillment of the automatic stop condition.

* * * * *